(12) United States Patent
Chen

(10) Patent No.: US 8,549,193 B2
(45) Date of Patent: Oct. 1, 2013

(54) DATA TRANSMISSION METHOD, DEVICE AND SYSTEM

(75) Inventor: Wumao Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/469,956

(22) Filed: May 11, 2012

(65) Prior Publication Data

US 2012/0254483 A1    Oct. 4, 2012

Related U.S. Application Data

(63) Continuation of application No. PCT/CN2011/075188, filed on Jun. 2, 2011.

(30) Foreign Application Priority Data

Nov. 12, 2010    (CN) .......................... 2010 1 0548381

(51) Int. Cl.
*G06F 13/00*    (2006.01)
(52) U.S. Cl.
USPC .............. 710/33; 710/4; 710/5; 710/6; 710/7; 710/17; 710/20; 710/34
(58) Field of Classification Search
USPC .......................... 710/4, 5, 6, 7, 17, 20, 33, 34
See application file for complete search history.

(56) References Cited

U.S. PATENT DOCUMENTS

| | | | |
|---|---|---|---|
| 6,258,698 B1 | 7/2001 | Iwasaki et al. | |
| 6,594,234 B1 | 7/2003 | Chard et al. | |
| 7,023,857 B1 * | 4/2006 | Chiussi et al. | 370/395.4 |
| 7,092,404 B1 | 8/2006 | Zboril et al. | |
| 2003/0016628 A1 | 1/2003 | Kadambi et al. | |
| 2003/0123393 A1 | 7/2003 | Feuerstraeter et al. | |
| 2009/0086636 A1 | 4/2009 | Chow et al. | |
| 2009/0290593 A1 | 11/2009 | Du et al. | |

FOREIGN PATENT DOCUMENTS

| | | |
|---|---|---|
| CN | 1633786 A | 6/2005 |
| CN | 101035067 A | 9/2007 |
| CN | 101340385 A | 1/2009 |
| CN | 101465806 A | 6/2009 |
| CN | 100550852 C | 10/2009 |
| EP | 2 129 058 A1 | 12/2009 |
| WO | WO 95/30294 A1 | 11/1995 |

OTHER PUBLICATIONS

International Search Report dated Sep. 8, 2011 in connection with International Patent Application No. PCT/CN2011/075188.

(Continued)

*Primary Examiner* — Idriss N Alrobaye
*Assistant Examiner* — Jasjit Vidwan

(57) ABSTRACT

A data transmission method is provided, which includes: obtaining a current queue length of a queue corresponding to an output port; when the current queue length meets a back-pressure requirement, determining a back-pressure priority corresponding to the current queue length according to the current queue length and a mapping relationship between a preset queue length and the back-pressure priority, and generating back-pressure information, where the back-pressure information inhibits a line card from sending data with a data priority less than or equal to the back-pressure priority to the output port; and sending the back-pressure information to a line card.

7 Claims, 3 Drawing Sheets

(56) References Cited

OTHER PUBLICATIONS

Supplementary European Search Report dated May 25, 2012 in connection with European Patent Application No. EP 11 78 3074.

Communication pursuant to Article 94(3) EPC dated Feb. 15, 2013 in connection with European Patent Application No. 11 783 074.5.
Partial translation of Office Action dated May 31, 2013 in connection with Chinese Patent Application No. 201010548381.9.

* cited by examiner

DATA TRANSMISSION METHOD, DEVICE AND SYSTEM

CROSS-REFERENCE TO RELATED APPLICATIONS

This application is a continuation of International Application No. PCT/CN2011/075188, filed on Jun. 2, 2011, which claims priority to Chinese Patent Application No. 201010548381.9, filed with the Chinese Patent Office on Nov. 12, 2010 and entitled "DATA TRANSMISSION METHOD, DEVICE AND SYSTEM", both of which are incorporated herein by reference in their entirety.

TECHNICAL FIELD

The present invention relates to the field of data transmission technologies, and in particular, to a data transmission method, device and system.

BACKGROUND

At present, in a packet switching communication system with a high capacity and a high throughput, information transmission between a line card and a switching network generally adopts a queue back-pressure mechanism, that is, the switching network detects a data sending condition at each output port, and when congestion occurs at the output port, the switching network generates back-pressure information to inform all the line cards to stop sending data to the output port. If two data streams of different service levels respectively come from two different line cards, the sending of the two data streams is stopped at the same time, and a data stream of a higher service level may also not be sent preferentially. Therefore, how to ensure the effective transmission of the data stream of the higher service level becomes a principal technical issue to be solved in the packet switching communication.

SUMMARY

In order to increase buffer space of data with a high priority and then further improve high throughput of data with a high priority in the switching network, embodiments of the present invention provide a data transmission method. The method includes:

obtaining a current queue length of a queue corresponding to an output port;

when the current queue length meets a back-pressure requirement, determining a back-pressure priority corresponding to the current queue length according to the current queue length and a mapping relationship between a preset queue length and the back-pressure priority, and generating back-pressure information, where the back-pressure information inhibits a line card from sending data with a data priority less than or equal to the back-pressure priority to the output port; and sending the back-pressure information to a line card, so that the line card stops sending the data with the data priority less than or equal to the back-pressure priority to the output port after receiving the back-pressure information.

An embodiment of the present invention provides a data transmission device, which includes:

a current queue length obtaining module, configured to obtain a current queue length of a queue corresponding to an output port;

a back-pressure information generation module, configured to, when the current queue length meets a back-pressure requirement, determine a back-pressure priority corresponding to the current queue length according to the current queue length and a mapping relationship between a preset queue length and the back-pressure priority, and generate back-pressure information, where the back-pressure information inhibits a line card from sending data with a data priority less than or equal to the back-pressure priority to the output port; and a back-pressure information sending module, configured to send the back-pressure information to a line card, so that the line card stops sending the data with the data priority less than or equal to the back-pressure priority to the output port after receiving the back-pressure information.

An embodiment of the present invention provides a data transmission system, which include a line card and a data transmission device, where, the line card is configured to send data to the data transmission device, and transmit data according to back-pressure information sent by the data transmission device; and the data transmission device is configured to obtain a current queue length of a queue corresponding to an output port; when the current queue length meets a back-pressure requirement, determine a back-pressure priority corresponding to the current queue length according to the current queue length and a mapping relationship between a preset queue length and the back-pressure priority, and generate back-pressure information, where the back-pressure information inhibits a line card from sending data with a data priority less than or equal to the back-pressure priority to the output port; and send the back-pressure information to a line card, so that the line card stops sending the data with the data priority less than or equal to the back-pressure priority to the output port after receiving the back-pressure information.

The beneficial effects of the technical solution provided by the embodiments of the present invention are as follows: the back-pressure information is generated according to the mapping relationship between the current queue length, the preset queue length and the priority, and the back-pressure information is sent to all the line cards in the current switching network, so that all the line cards transmit data according to the back-pressure information, which alleviates the problem that a great deal of data with a low priority occupies the buffer of the switching network over a long period of time, so that the buffer reserved for the data with a high priority is increased, thereby improving an anti-burst capability of the switching network, and increasing the high throughput of data with a high priority in the switching network.

DETAILED DESCRIPTION

In order to make the objectives, technical solutions, and advantages of the present invention more comprehensible, the implementation manner of the present invention is further described below in detail with reference to the accompanying drawings.

Embodiment 1

Figure 1:
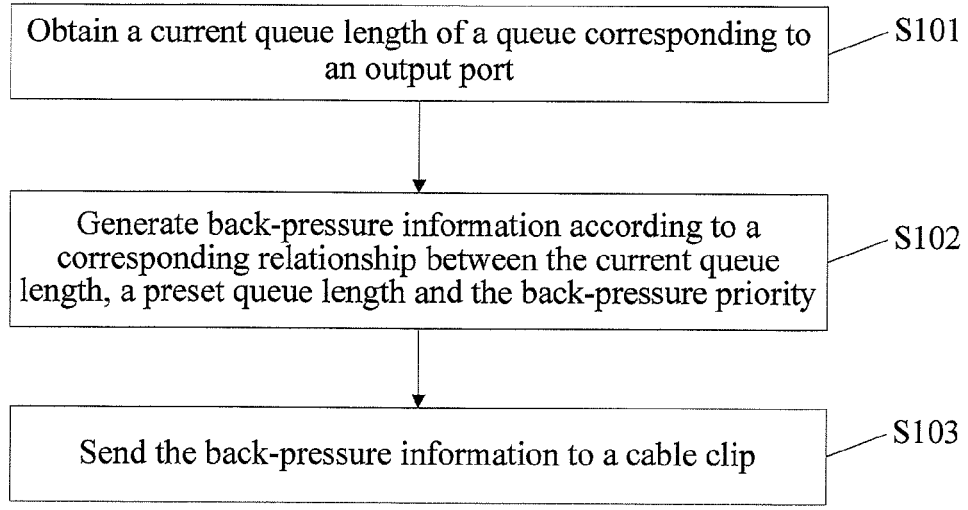
FIG. 1 is a flow chart of a data transmission method according to Embodiment 1 of the present invention.

As shown in FIG. 1, an embodiment of the present invention provides a data transmission method, which includes the following steps:

S101: Obtain a current queue length of a queue corresponding to an output port.

S102: When the current queue length meets a back-pressure requirement, determine a back-pressure priority corresponding to the current queue length according to the current queue length and a mapping relationship between a preset queue length and the back-pressure priority, and generate back-pressure information, where the back-pressure information inhibits a line card from sending data with a data priority less than or equal to the back-pressure priority to the output port.

S103: Send the back-pressure information to a line card, so that the line card stops sending the data with the data priority less than or equal to the back-pressure priority to the output port after receiving the back-pressure information.

In the embodiment of the present invention, when the current queue length meets the back-pressure requirement (for example, when congestion occurs), the back-pressure priority corresponding to the current queue length is determined according to the mapping relationship between the current queue length, the preset queue length and the back-pressure priority, and the back-pressure information is generated, where the back-pressure information inhibits all the line cards from sending data with the data priority less than or equal to the back-pressure priority to the output port, so that the line cards stop sending the data with the priority less than or equal to the back-pressure priority to the output port after receiving the back-priority information, which alleviates the problem that a great deal of data with a low priority occupies the buffer of the switching network over a long period of time, so that the buffer reserved for the data with a high priority is increased, thereby improving an anti-burst capability of the switching network, and increasing high throughput of a the high priority in the switching network. Further, because each output port of the switching network uses a single queue to store the data received by the port, and the queue outputs the stored data through a First In First Out principle, the period of time for the holdup of the data is shortened, thereby reducing sequencing/reassembly resources of a downlink reassembly module connected to the switching network, and improving a sequencing/reassembly capability of the reassembly module.

Embodiment 2

Figure 2:
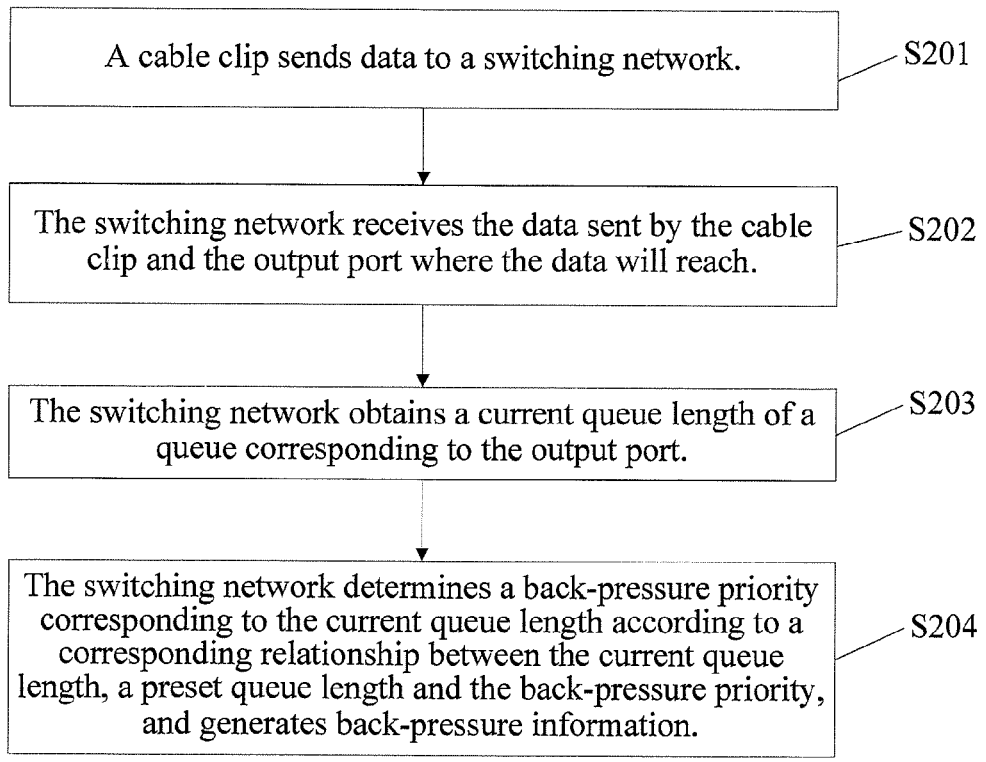
FIG. 2 is a flow chart of another data transmission method according to Embodiment 2 of the present invention.

As shown in FIG. 2, an embodiment of the present invention provides a data transmission method, which includes the following steps:

S201: A line card sends data to a switching network, where the data includes an output port where the data will reach.

Preferably, the line card uses queues with different priorities to store data with a corresponding data priority, and uses a priority scheduling mechanism to selectively send the data in the queues with different priorities.

Figure 3:
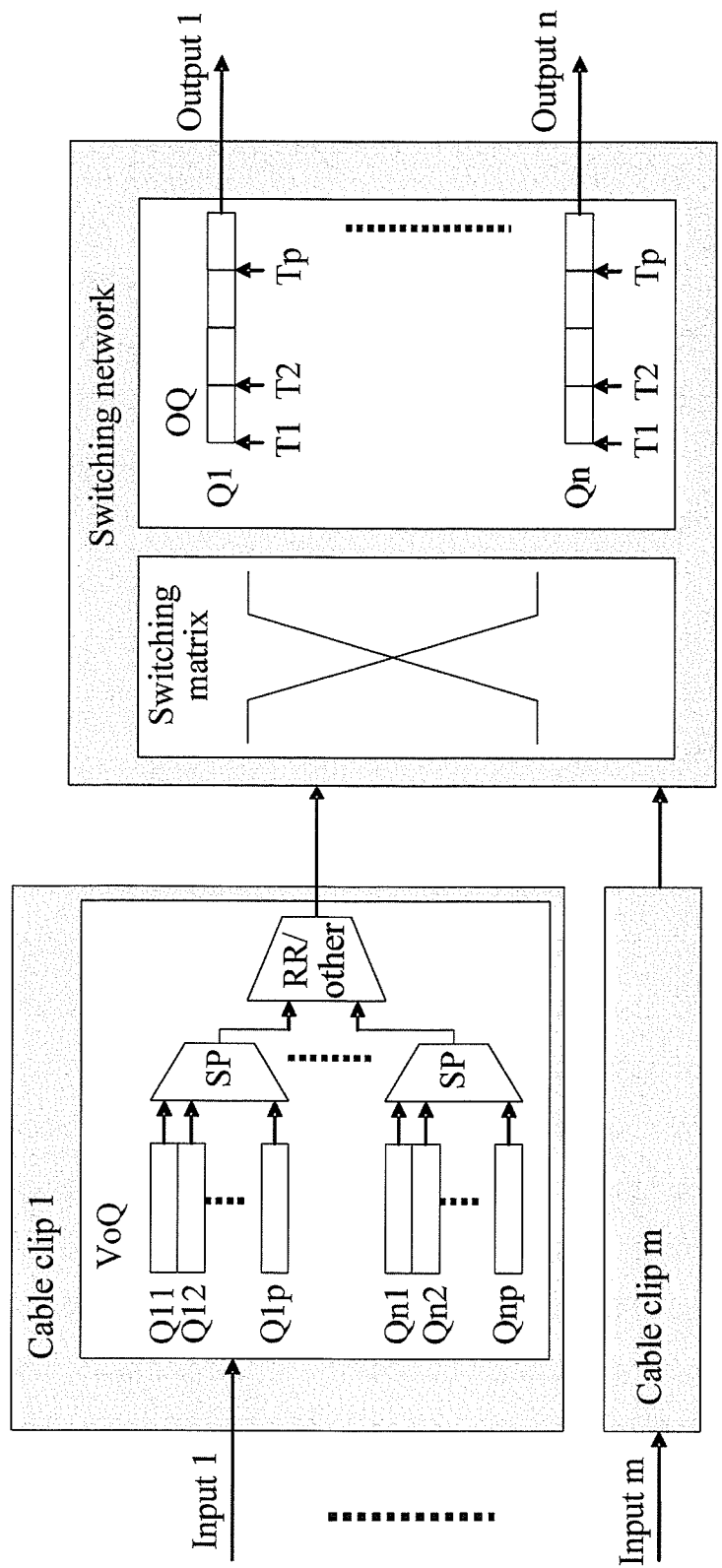
FIG. 3 is a schematic diagram of a data transmission network according to Embodiment 2 of the present invention.

For example, as shown in FIG. 3, the line card uses p*n queues, and uses SP (strict priority) scheduling among p queues corresponding to the same egress of the line card, where, p is the amount of the queue priorities, that is, the line card is set such that upon the setting of a priority for the data, one queue for storing the data with the priority exists; and n is the amount of the egresses of each line card.

The line card 1 and the line card m both have traffic to be delivered to the port 1 of the switching network for outputting, where the line card 1 has the traffic with a low priority, the priority level is p, and the corresponding queue is Q1$p$; the line card m has the traffic with a high priority, the priority level is 1, and the corresponding queue is Q11.

S202: The switching network receives the data sent by the line card and the output port where the data will reach.

Specifically, the switching network stores the data into a queue corresponding to the output port according to the output port designated by the data.

For example, as shown in FIG. 3, each port of the switching network is merely configured with one queue, after receiving the data sent by the line card, the switching network obtains the output port designated by the data, and stores the data into the output queue corresponding to the port. The line card 1 sends Data 1, and designates an output port 1 of the switching network to output the data. Then, the switching network stores the Data 1 into a queue Q1 corresponding to the output port 1. Likewise, the line card m sends the Data M, and designates the output port 1 of the switching network to output the data. Then, the switching network stores the Data 1 into a queue Q1 corresponding to the output port 1.

S203: The switching network obtains a current queue length of a queue corresponding to the output port.

S204: When the current queue length meets a back-pressure requirement, the switching network determines a back-pressure priority corresponding to the current queue length according to the current queue length and a mapping relationship between a preset queue length and the back-pressure priority, and generates back-pressure information.

The back-pressure information inhibits the line card from sending data with a data priority less than or equal to the back-pressure priority to the output port.

Optionally, the mapping relationship between the preset queue length and the back-pressure priority is a mapping relationship between a queue length value and the back-pressure priority. Then, step S204 may specifically be: the switching network queries the mapping relationship between the queue length value and the back-pressure priority, and determines that the current queue length meets the back-pressure requirement when a queue length value is the same as the current queue length. At this time, the switching network obtains a back-pressure priority corresponding to the value of the current queue length, generates back-pressure information, that is, the back-pressure information inhibiting all line cards connected to the switching network from sending the data with a priority less than or equal to the corresponding back-pressure priority to the output port.

For example, when the current queue length, which is obtained by the switching network and is of the queue Q1 corresponding to the output port 1, is L1, and a mapping relationship between the preset queue length and the back-pressure priority is shown in table 1, by querying the mapping relationship between the preset queue length and the back-pressure priority as shown in table 1, the switching network obtains a queue length that is the same as the current queue length and is existing in the mapping relationship shown in table 1, that is, L1 exists; and the switching network obtains a back-pressure priority 1 corresponding to L1 according to L1, and generates back-pressure information, where the back-pressure information inhibits all the line cards from sending data with a data priority less than or equal to n to the output port 1.

TABLE 1

| Queue length | Back-pressure priority |
|---|---|
| L1 | n |
| L2 | n − 1 |
| ... | ... |
| Ln | 1 |

Further, optionally, the mapping relationship between the preset queue length and the back-pressure priority may be further a mapping relationship between a queue length interval and the back-pressure priority. Then, step S204 may specifically be: the switching network queries the mapping relationship between the queue length interval and the back-pressure priority, and determines that the current queue length meets the back-pressure requirement when a queue length interval including the current queue length exists. At this time, the switching network obtains the queue length interval where the current queue length reside, and further obtains a back-pressure priority corresponding to the queue length interval where the current queue length reside, and generates back-pressure information, that is, the back-pressure information inhibits all line cards connected to the switching network from sending the data with a priority less than or equal to the corresponding back-pressure priority to the output port.

For example, as shown in FIG. 3, the queue Q1 corresponding to the switching network port 1 has T1-Tp queue length intervals, the current queue length of the queue resides in the queue interval T3, and then priority 3 corresponding to the queue length interval T3 is obtained.

In the mapping relationship between the preset queue length value and the back-pressure priority, the amount of the back-pressure priorities is less than or equal to the amount of the data priorities. The priority is one or more of the priorities of the data sent by the line cards connected to the switching network, and each priority corresponds to a queue length, that is, when one queue length exists, one corresponding data priority exists; and when more queue lengths exist, multiple data priorities corresponding to the queue lengths exist. Preferably, as shown in FIG. 3, if the line card sets p priorities for the data, T1-Tp queue lengths corresponding to the priorities exist in the queue Q1 of the output port 1 of the switching network, that is, the priority corresponding to the queue length of the queue of the output port of the switching network corresponds to the priority of the data sent by the line card. Further, a mapping relationship set of the queue length interval of the queue and the priority may be formed through the mapping relationship between each queue length and the priority.

Further, the switching network sends the back-pressure information to all the line cards, all the line cards connected to switching network receives the back-pressure information sent by the switching network and transmits data to the switching network according to the back-pressure information.

Specifically, the switching network sends, to all the line cards connected to the switching network, the back-pressure information of inhibiting all the line cards from sending data with a priority less than or equal to the corresponding priority to the output port.

For example, as shown in FIG. 3, when the generated back-pressure information is the data with a priority less than or equal to 3, in which the data is inhibited from being sent from all the line cards to the port 1, the switching network sends the back-pressure information to the line cards 1-m to inhibit the line cards 1-m from sending the data with the priority less than or equal to 3; and the line cards 1-m stops sending the data with the priority less than or equal to 3 to the port 1 after receiving the back-pressure information.

Meanwhile, each output port of the switching network sequentially outputs the data stored in the corresponding queue. Optionally, each output port of the switching network obtains data from the corresponding queue according to a First In First Out principle and sends the data.

In addition, the specific sequence of steps S201-S202 in this embodiment is not limited to a sequence before step S203, that is, the current queue length of the queue that is corresponding to the output port and is obtained in step S203 in the embodiment of the present invention may be a queue length of a corresponding queue before the data received by the current switching network is stored into the corresponding queue, or a queue length of a corresponding queue after the data is stored into the corresponding queue.

Therefore, optionally, the steps S201 and S202 may not be performed before step S203, that is, the method of this embodiment may be directly started from step S203, and at this time, the current queue length in step S203 is a queue length of the queue of the output port, where the received data is not added into the queue of the output port. If the current queue length meets the back-pressure requirement, step S204 is performed; and if the current queue length does not meet the back-pressure requirement, step S202 is performed, and the process is repeated.

In the embodiment of the present invention, when the current queue length meets the back-pressure requirement, the back-pressure priority corresponding to the current queue length is determined according to the mapping relationship between the current queue length, the preset queue length and the back-pressure priority, and the back-pressure information is generated, where the back-pressure information inhibits all the line cards from sending the data with the data priority less than or equal to the back-pressure priority to the output port, so that the line cards stop sending the data with the priority less than or equal to the back-pressure priority to the output port after receiving the back-priority information, which alleviates the problem that a great deal of data with a low priority occupies the buffer of the switching network over a long period of time, so that the buffer reserved for the data with a high priority is increased, thereby improving an anti-burst capability of the switching network, and increasing the high throughput of data with a high priority in the switching network. Further, because each output port of the switching network uses a single queue to store the data received by the port, and the queue outputs the stored data through a First In First Out principle, the period of time for the holdup of the data is shortened, thereby reducing sequencing/reassembly resources of a downlink reassembly module connected to the switching network, and improving a sequencing/reassembly capability of the reassembly module.

Embodiment 3

Figure 4:
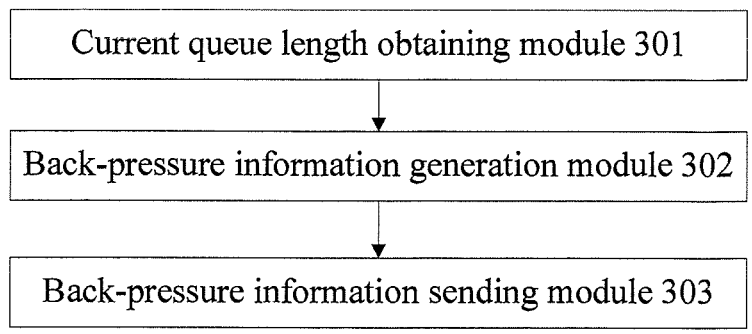
FIG. 4 is a schematic structural diagram of a data transmission device according to Embodiment 3 of the present invention.

As shown in FIG. 4, an embodiment of the present invention provides a data transmission device, which includes:

a current queue length obtaining module 301, configured to obtain a current queue length of a queue corresponding to an output port;

a back-pressure information generation module 302, configured to, when the current queue length meets a back-pressure requirement, determine a back-pressure priority corresponding to the current queue length according to the current queue length and a mapping relationship between a preset queue length and the back-pressure priority, and generate back-pressure information, where the back-pressure information inhibits a line card from sending data with a data priority less than or equal to the back-pressure priority to the output port; and a back-pressure information sending module 303, configured to send the back-pressure information to a line card, so that the line card stops sending the data with the data priority less than or equal to the back-pressure priority to the output port after receiving the back-pressure information.

In the embodiment of the present invention, when the current queue length meets the back-pressure requirement, the back-pressure priority corresponding to the current queue length is determined according to the mapping relationship between the current queue length, the preset queue length and the back-pressure priority, and the back-pressure information is generated, where the back-pressure information inhibits all the line cards from sending the data with the data priority less than or equal to the back-pressure priority to the output port, so that the line cards stop sending the data with the priority less than or equal to the back-pressure priority to the output port after receiving the back-priority information, which alleviates the problem that a great deal of data with a low priority occupies the buffer of the switching network over a long period of time, so that the buffer reserved for the data with a high priority is increased, thereby improving an anti-burst capability of the switching network, and increasing the high throughput of data with a high priority in the switching network. Further, because each output port of the switching network uses a single queue to store the data received by the port, and the queue outputs the stored data through a First In First Out principle, the period of time for the holdup of the data is shortened, thereby reducing sequencing/reassembly resources of a downlink reassembly module connected to the switching network, and improving a sequencing/reassembly capability of the reassembly module.

Embodiment 4

Figure 5:
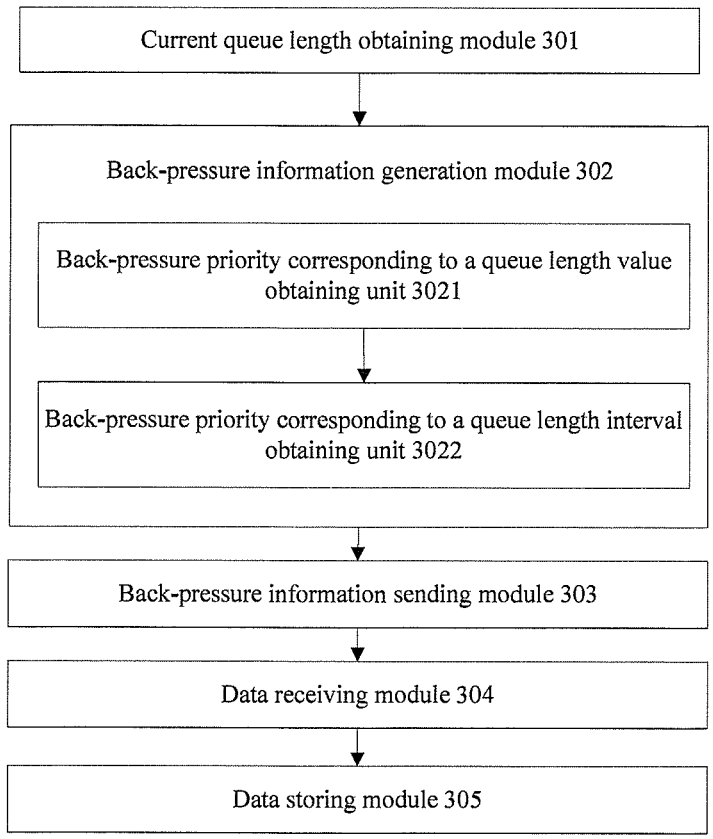
FIG. 5 is a schematic structural diagram of another data transmission device according to Embodiment 3 of the present invention.

As shown in FIG. 5, an embodiment of the present invention provides a data transmission device, which includes:

a current queue length obtaining module 301, configured to obtain a current queue length of a queue corresponding to an output port;

a back-pressure information generation module 302, configured to, when the current queue length meets a back-pressure requirement, determine a back-pressure priority corresponding to the current queue length according to the current queue length and a mapping relationship between a preset queue length and the back-pressure priority, and generate back-pressure information, where the back-pressure information inhibits a line card from sending data with a data priority less than or equal to the back-pressure priority to the output port; and a back-pressure information sending module 303, configured to send the back-pressure information to a line card, so that the line card stops sending the data with the data priority less than or equal to the back-pressure priority to the output port after receiving the back-pressure information.

Preferably, in the mapping relationship between the preset queue length and the back-pressure priority, the amount of the back-pressure priorities is less than or equal to the amount of the data priorities.

Further, preferably, the line card uses queues with different priorities to store the data with the corresponding data priority, and uses a priority scheduling mechanism to selectively send the data in the queues with different priorities.

Optionally, the mapping relationship between the preset queue length and the back-pressure priority is a mapping relationship between a queue length value and the back-pressure priority or a mapping relationship between a queue length interval and the back-pressure priority.

When the mapping relationship between the preset queue length and the back-pressure priority is the mapping relationship between a queue length value and the back-pressure priority, the back-pressure information generation module 302 further includes:

an obtaining unit 3021 for obtaining a back-pressure priority corresponding to a queue length value, configured to query the mapping relationship, and obtain a back-pressure priority corresponding to a value of the current queue length.

When the mapping relationship between the preset queue length and the back-pressure priority is the mapping relationship between a queue length interval and the back-pressure priority, the back-pressure information generation module 302 further includes:

an obtaining unit 3022 for obtaining a back-pressure priority corresponding to a queue length interval, configured to query the mapping relationship, and obtain a back-pressure priority corresponding to the queue length interval where the current queue length resides.

Optionally, the device further includes:

a data receiving module 304, configured to receive data sent by a line card, where the data includes an output port where the data will reach; and a data storing module 305, configured to store the data into a queue corresponding to the output port.

In the embodiment of the present invention, when the current queue length meets the back-pressure requirement, the back-pressure priority corresponding to the current queue length is determined according to the mapping relationship between the current queue length, the preset queue length and the back-pressure priority, and the back-pressure information is generated, where the back-pressure information inhibits all the line cards from sending the data with the data priority less than or equal to the back-pressure priority to the output port, so that the line cards stop sending the data with the priority less than or equal to the back-pressure priority to the output port after receiving the back-priority information, which alleviates the problem that a great deal of data with a low priority occupies the buffer of the switching network over a long period of time, so that the buffer reserved for the data with a high priority is increased, thereby improving an anti-burst capability of the switching network, and increasing the high throughput of data with a high priority in the switching network. Further, because each output port of the switching network uses a single queue to store the data received by the port, and the queue outputs the stored data through a First In First Out principle, the period of time for the holdup of the data is shortened, thereby reducing sequencing/reassembly resources of a downlink reassembly module connected to the switching network, and improving a sequencing/reassembly capability of the reassembly module.

Embodiment 5

Figure 6:
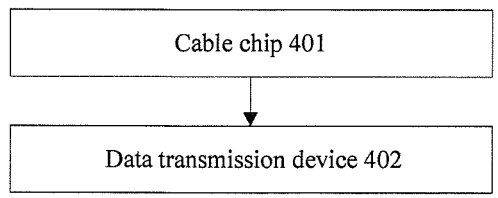
FIG. 6 is a schematic diagram of a data transmission system according to Embodiment 4 of the present invention.

As shown in FIG. 6, an embodiment of the present invention provides a data transmission system, which includes a cable chip 401 and a data transmission device 402.

The line card 401 is configured to send data to the data transmission device, and transmit data according to back-pressure information sent by the data transmission device.

The data transmission device 402 is configured to obtain a current queue length of a queue corresponding to an output port; when the current queue length meets a back-pressure requirement, determine a back-pressure priority corresponding to the current queue length according to the current queue length and a mapping relationship between a preset queue length and the back-pressure priority, and generate back-pressure information, where the back-pressure information inhibits a line card from sending data with a data priority less than or equal to the back-pressure priority to the output port; and send the back-pressure information to a line card, so that the line card stops sending the data with the data priority less than or equal to the back-pressure priority to the output port after receiving the back-pressure information.

In the embodiment of the present invention, when the current queue length meets the back-pressure requirement, the back-pressure priority corresponding to the current queue length is determined according to the mapping relationship between the current queue length, the preset queue length and the back-pressure priority, and the back-pressure information is generated, where the back-pressure information inhibits all the line cards from sending the data with the data priority less than or equal to the back-pressure priority to the output port, so that the line cards stop sending the data with the priority less than or equal to the back-pressure priority to the output port after receiving the back-priority information, which alleviates the problem that a great deal of data with a low priority occupies the buffer of the switching network over a long period of time, so that the buffer reserved for the data with a high priority is increased, thereby improving an anti-burst capability of the switching network, and increasing the high throughput of data with a high priority in the switching network. Further, because each output port of the switching network uses a single queue to store the data received by the port, and the queue outputs the stored data through a First In First Out principle, the period of time for the holdup of the data is shortened, thereby reducing sequencing/reassembly resources of a downlink reassembly module connected to the switching network, and improving a sequencing/reassembly capability of the reassembly module.

All or a part of the content of the technical solutions according to the embodiments of the present invention may be implemented by a software program. The software program is stored in a readable storage medium, such as a hard disk, an optical disk or a floppy disk in a computer.

The above descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A data transmission method, comprising:
   obtaining a current queue length of a queue corresponding to an output port;
   when the current queue length meets a back-pressure requirement, determining a back-pressure priority corresponding to the current queue length according to the current queue length and a mapping relationship between a preset queue length and the back-pressure priority, and generating back-pressure information, wherein the back-pressure information inhibits a line card to send data with a data priority less than or equal to the back-pressure priority to the output port; wherein the mapping relationship between the preset queue length and the back-pressure priority is a mapping relationship between the preset queue length and the back-pressure priority or a mapping relationship between a queue length interval and the back-pressure priority; and
   sending the back-pressure information to a line card to prevent the card from sending the data with the data priority less than or equal to the back-pressure priority to the output port after receiving the back-pressure information;
   wherein if the mapping relationship between the preset queue length and the back-pressure priority is the mapping relationship between the queue length value and the back-pressure priority, the determining the back-pressure priority corresponding to the current queue length comprises: querying the mapping relationship, and obtaining a back-pressure priority corresponding to a value of the current queue length; and
   if the mapping relationship between the preset queue length and the back-pressure priority is the mapping relationship between the queue length interval and the back-pressure priority, the determining the back-pressure priority corresponding to the current queue length comprises: querying the mapping relationship, and obtaining a back-pressure priority corresponding to a queue length interval where the current queue length resides.

2. The method according to claim 1, wherein, in the mapping relationship between the preset queue length and the back-pressure priority, the amount of the back-pressure priorities is less than or equal to the amount of the data priorities.

3. The method according to claim 1, wherein before obtaining the current queue length of the queue corresponding to the output port, the method comprises: receiving data sent by a line card, wherein the data comprises an output port where the data will reach; and
   storing the data into a queue corresponding to the output port.

4. A data transmission device, comprising:
   a current queue length obtaining module, configured to obtain a current queue length of a queue corresponding to an output port;
   a back-pressure information generation module, configured to, when the current queue length meets a back-pressure requirement, determine a back-pressure priority corresponding to the current queue length according to the current queue length and a mapping relationship between a preset queue length and the back-pressure priority, and generate back-pressure information, wherein the back-pressure information inhibits a line card from sending data with a data priority less than or equal to the back-pressure priority to the output port; wherein the mapping relationship between the preset queue length and the back-pressure priority is a mapping relationship between a queue length value and the back-pressure priority or a mapping relationship between a queue length interval and the back-pressure priority; and
   a back-pressure information sending module, configured to send the back-pressure information to a line card to prevent the card from sending the data with the data priority less than or equal to the back-pressure priority to the output port after receiving the back-pressure information;
   wherein if the mapping relationship between the preset queue length and the back-pressure priority is the between the queue length value and the back-pressure priority, the back-pressure information generation module further comprises: a back-pressure priority corresponding to a queue length value obtaining unit, configured to query the mapping relationship, and obtain a back-pressure priorty corresponding to a value of the current queue length; and if the mapping relationship between the preset queue length and the back-pressure priority is the mapping relationship between the queue length interval and the back-pressure priority, the back-pressure information generation module further comprises:

a back-pressure priority corresponding to a queue length interval obtaining unit, configured to query the mapping relationship, and obtain a back-pressure priority corresponding to a queue length interval where the current queue length resides.

5. The device according to claim 4, wherein the line card uses queues with different priorities to store data with a corresponding data priority, and uses a priority scheduling mechanism to selectively send the data in the queues with different priorities.

6. The device according to claim 4, further comprising:

a data receiving module, configured to receive data sent by a line card, wherein the data comprises an output port where the data will reach; and a data storing module, configured to store the data into a queue corresponding to the output port.

7. A data transmission system, comprising: a line card and a data transmission device, characterized in that wherein the line card is configured to send data to the data transmission device, and transmit data according to back-pressure information sent by the data transmission device; and the data transmission device is configured to obtain a current queue length of a queue corresponding to an output port; when the current queue length meets a back-pressure requirement, determine a back-pressure priority corresponding to the current queue length according to the current queue length and a mapping relationship between a preset queue length and the back-pressure priority, and generate back-pressure information, wherein the back-pressure information inhibits a line card from sending data with a data priority less than or equal to the back-pressure priority to the output port; wherein the mapping relationship between the preset queue length and the back-pressure priority is a mapping relationship between a queue length value and the back-pressure priority or a mapping relationship between a queue length interval and the back-pressure priority; and send the back-pressure information to a line card to prevent the line card from sending the data with the data priority less than or equal to the back-pressure priority to the output port after receiving the back-pressure information;

wherein if the mapping relationship between the preset queue length and the back-pressure priority is the mapping relationship between the queue length value and the back-pressure priority, the determining the back-pressure priority corresponding to the current queue length comprises: querying the mapping relationship, and obtaining a back-pressure priority corresponding to a value of the current queue length; and if the mapping relationship between the preset queue length and the back-pressure priority is the mapping relationship between the queue length interval and the back-pressure priority, the determining the back-pressure priority corresponding to the current queue length comprises: querying the mapping relationship, and obtaining a back-pressure priority corresponding to a queue length interval where the current queue length resides.

* * * * *

UNITED STATES PATENT AND TRADEMARK OFFICE
CERTIFICATE OF CORRECTION

PATENT NO. : 8,549,193 B2  
APPLICATION NO. : 13/469956  
DATED : October 1, 2013  
INVENTOR(S) : Wumao Chen It is certified that error appears in the above-identified patent and that said Letters Patent is hereby corrected as shown below:

In the claims

Column 10, Claim 1, line 3, delete "the preset" and insert -- a --; and

Column 10, Claim 4, line 65, after "priority is the", insert -- mapping relationship --.

Signed and Sealed this  
Ninth Day of February, 2016

Michelle K. Lee  
*Director of the United States Patent and Trademark Office*